(12) United States Patent
Shionoya et al.

(10) Patent No.: US 12,265,810 B2
(45) Date of Patent: Apr. 1, 2025

(54) VEHICLE CONTROL SYSTEM AND PROGRAM WRITING METHOD

(71) Applicant: HONDA MOTOR CO., LTD., Tokyo (JP)

(72) Inventors: Yosuke Shionoya, Tokyo (JP); Satoshi Kono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 18/177,186

(22) Filed: Mar. 2, 2023

(65) Prior Publication Data

US 2023/0315419 A1 Oct. 5, 2023

(30) Foreign Application Priority Data

Mar. 31, 2022 (JP) .................................. 2022-060760

(51) Int. Cl.
*G06F 8/61* (2018.01)
*B60R 16/023* (2006.01)

(52) U.S. Cl.
CPC .............. *G06F 8/61* (2013.01); *B60R 16/023* (2013.01)

(58) Field of Classification Search
CPC ................................. G06F 8/61; B60R 16/023
USPC .................................................. 717/120–178
See application file for complete search history.

(56) References Cited

U.S. PATENT DOCUMENTS

| | | | | |
|---|---|---|---|---|
| 9,086,941 B1 * | 7/2015 | Siegel | ...................... | H04L 67/55 |
| 9,557,981 B2 * | 1/2017 | Throop | ................... | G06F 8/654 |
| 11,150,885 B2 * | 10/2021 | Daum | ...................... | G06F 8/65 |
| 11,669,323 B2 * | 6/2023 | Harata | .................. | B60W 50/00 |
| | | | | 717/169 |
| 11,822,366 B2 * | 11/2023 | Harata | .................. | G06F 3/0679 |
| 11,985,238 B2 * | 5/2024 | Yang | ........................ | H04L 9/08 |
| 2014/0282470 A1 * | 9/2014 | Buga | ........................ | G06F 8/65 |
| | | | | 717/170 |

(Continued)

FOREIGN PATENT DOCUMENTS

JP 2019-144669 A 8/2019

OTHER PUBLICATIONS

Short, Michael, and Michael J. Pont. "Hardware in the loop simulation of embedded automotive control system." Proceedings. 2005 IEEE Intelligent Transportation Systems, 2005.. IEEE, 2005. pp. 426-431. (Year: 2005).*

(Continued)

*Primary Examiner* — Satish Rampuria
(74) *Attorney, Agent, or Firm* — Rankin, Hill & Clark LLP

(57) ABSTRACT

A vehicle control system includes a vehicle control unit which includes a first memory and controls a function unit installed in a vehicle by executing a program stored in the memory and a master control unit which is connected with the vehicle control unit, and the master control unit includes a second memory, stores writing data for writing the program to the first memory in the second memory, is capable of executing a writing process of writing the program to the first memory provided to the vehicle control unit based on the writing data, selects a processing target control unit, which is set as a target of the writing process, from plural vehicle control units based on a predetermined selection condition, transmits a wake-up request to the processing target control unit, and subsequently performs the writing process for the processing target control unit.

9 Claims, 8 Drawing Sheets

(56) References Cited

U.S. PATENT DOCUMENTS

2019/0258469 A1* 8/2019 Hayashidera ............. G06F 8/65

OTHER PUBLICATIONS

Moreno, Jorge, Micah E. Ortúzar, and Juan W. Dixon. "Energy-management system for a hybrid electric vehicle, using ultracapacitors and neural networks." IEEE transactions on Industrial Electronics 53.2 (2006): pp. 614-623. (Year: 2006).*

Koscher, Karl, et al. "Experimental security analysis of a modern automobile." 2010 IEEE symposium on security and privacy. IEEE, 2010. pp. 447-462. (Year: 2010).*

Falcone, Paolo, et al. "Predictive active steering control for autonomous vehicle systems." IEEE Transactions on control systems technology 15.3 (2007): pp. 566-580. (Year: 2007).*

Cardarilli, Gian Carlo, et al. "Design of a fault tolerant solid state mass memory." IEEE Transactions on Reliability 52.4 (2003): pp. 476-491. (Year: 2003).*

Nishimichi, Yoshito, et al. "UniPhier: series development and SoC management." 2009 Asia and South Pacific Design Automation Conference. IEEE, 2009. pp. 540-545 (Year: 2009).*

Lin, Yu-Jin, et al. "Blockchain-based intelligent charging station management system platform." IEEE Access 10 (2022): pp. 101936-101956. (Year: 2022).*

* cited by examiner

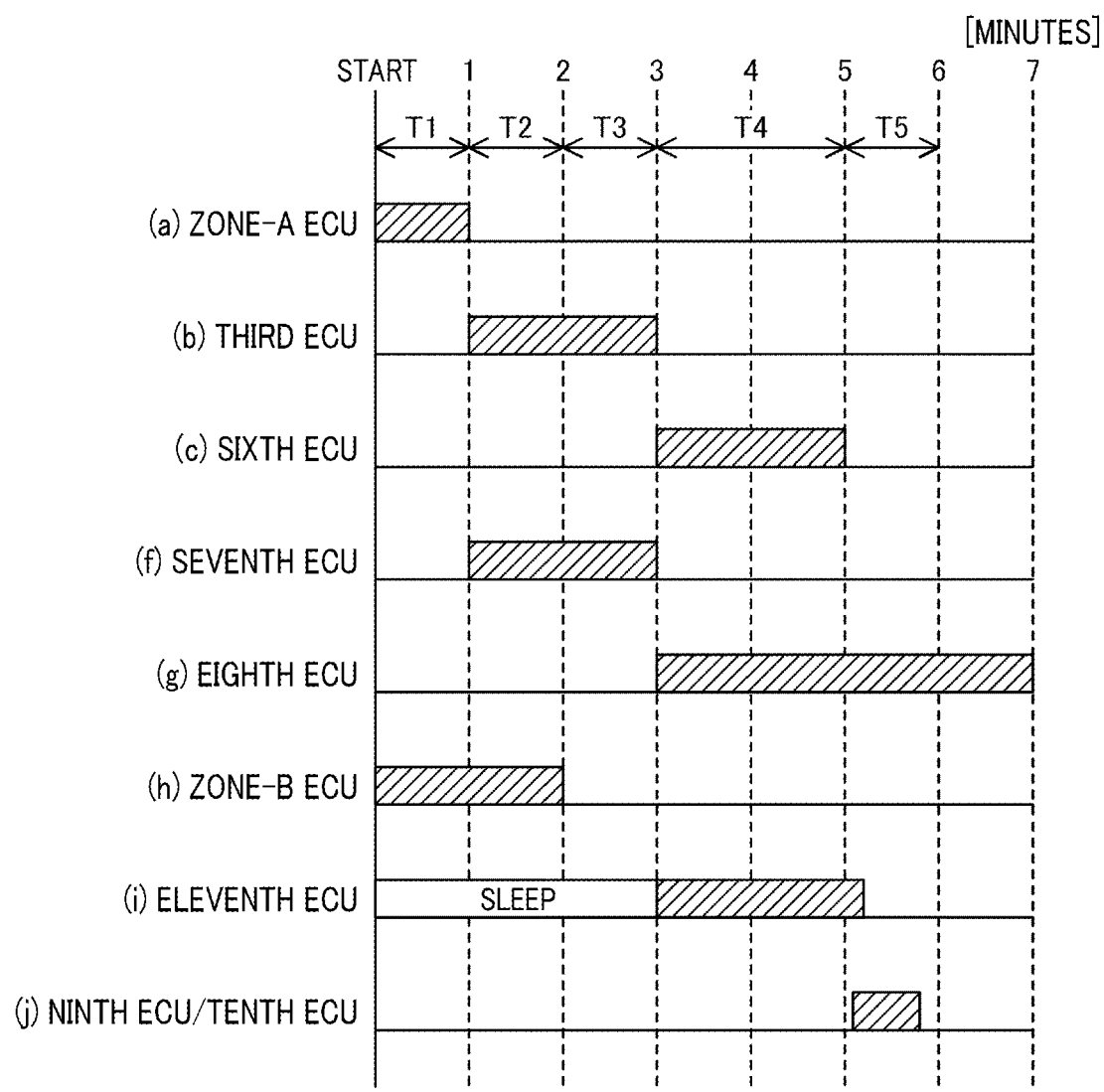

VEHICLE CONTROL SYSTEM AND PROGRAM WRITING METHOD

INCORPORATION BY REFERENCE

The present application claims priority under 35 U.S.C. § 119 to Japanese Patent Application No. 2022-060760 filed on Mar. 31, 2022. The content of the application is incorporated herein by reference in its entirety.

BACKGROUND OF THE INVENTION

Field of the Invention

The present invention relates to a vehicle control system and a program writing method.

Description of the Related Art

In recent years, with sophistication of functions of vehicles, an increase in electronic control units (ECU) installed in a vehicle and sophistication of programs controlling ECUs have been progressing. For example, achievement in research and development about an improvement in fuel efficiently which contributes to higher energy efficiency has been applied to vehicles, and enhancement of functions of an ECU which controls an engine or a motor has been progressing. Further, installation of a sophisticated ECU which deals with driving assistance technologies and preventive safety technologies has been progressing. With such technological evolution, management of programs installed in an ECU has become an important problem. For example, Japanese Patent Laid-Open No. 2019-144669 discloses a method of updating an ECU which is installed in a vehicle.

SUMMARY OF THE INVENTION

Technical Problem

A program to be executed by an ECU is demanded to be compatible with a specification of a vehicle, and version upgrading of a program is performed with the aim of an improvement in a function and an improvement in reliability. Consequently, in a process of manufacturing a vehicle, necessity of checking a specification or a version of a program for an ECU occurs. For example, as for some ECUs, programs are written in those by a supplier manufacturing the ECUs, and the ECUs are thereafter supplied to manufacturing steps. For such ECUs, in the manufacturing steps of the vehicle, it is necessary to check compatibility between the programs and the specification of the vehicle and the versions of the programs, and the programs are updated in accordance with necessity. Consequently, there has been a problem that management of the programs of the ECUs in the manufacturing steps of the vehicle is time consuming. In view of reduction in an emission amount of carbon dioxide in manufacturing steps of the vehicle, it is desirable to shorten a time period for management of a program for an ECU and to improve manufacturing efficiency of the vehicle.

An object of the present invention, which has been made in consideration of such a background, is to shorten a work time period for management of a program for an ECU to be installed in a vehicle and to improve manufacturing efficiency of a vehicle.

Solution to Problem

One aspect for achieving the above object provides a vehicle control system including: a vehicle control unit which includes a non-volatile program storage unit and controls a function unit installed in a vehicle by executing a program stored in the program storage unit; and a master control unit which is connected with the vehicle control unit, in which the master control unit includes a non-volatile master storage unit, stores writing data for writing the program to the program storage unit in the master storage unit, is capable of executing a writing process of writing the program to the program storage unit provided to the vehicle control unit based on the writing data, selects a processing target control unit, which is set as a target of the writing process, from plural vehicle control units based on a predetermined selection condition, transmits a wake-up request to the processing target control unit, and subsequently performs the writing process for the processing target control unit.

In the above configuration, a master control unit can write a program to a vehicle control unit in manufacturing steps of a vehicle. Accordingly, the vehicle control unit in a state where the program is not installed can be supplied to the manufacturing steps of the vehicle, and the program can be written in the manufacturing steps of the vehicle. Thus, a step of checking a specification or a state of the program of the vehicle control unit and a step of writing the program to each vehicle control unit can be skipped or simplified. Consequently, it is possible to shorten a production time period in a manufacturing factory of the vehicle while an improvement in fuel efficiency of the vehicle and installation of driving assistance technologies and preventive safety technologies in the vehicle are handled, and reduction in an emission amount of carbon dioxide in the manufacturing steps of the vehicle can be realized.

BRIEF DESCRIPTION OF DRAWINGS

FIG. 8 is a timing chart illustrating actions of the vehicle control system;

DETAILED DESCRIPTION OF THE PREFERRED EMBODIMENT

Figure 1:
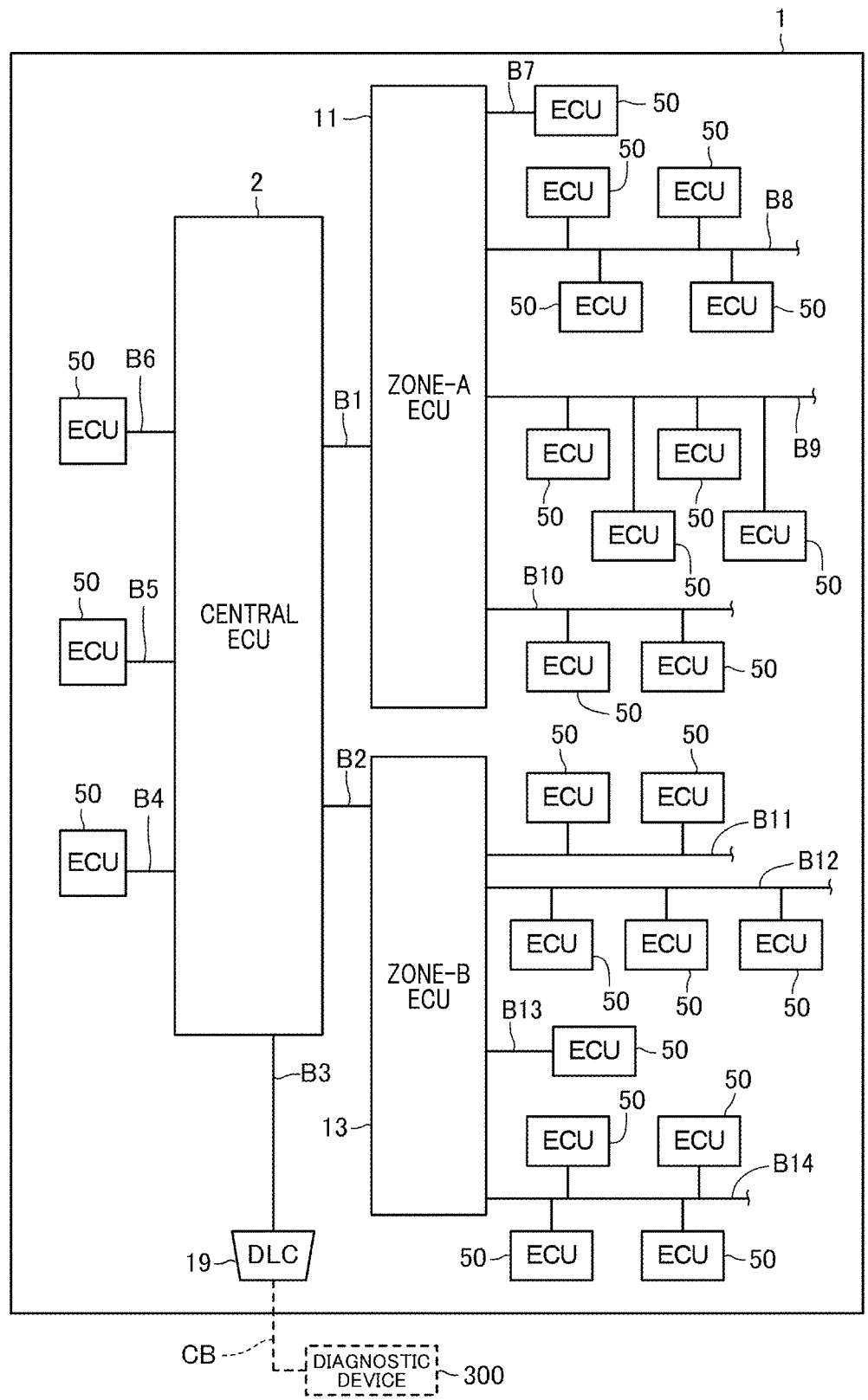
FIG. 1 is an outline configuration diagram of a vehicle control system.

FIG. 1 is a diagram illustrating a vehicle control system 1.

The vehicle control system 1 is formed from plural ECUs 50 which control function units installed in a vehicle. The vehicle control system 1 controls the function units of the vehicle and thereby realizes travel of the vehicle and various functions.

Figure 2:
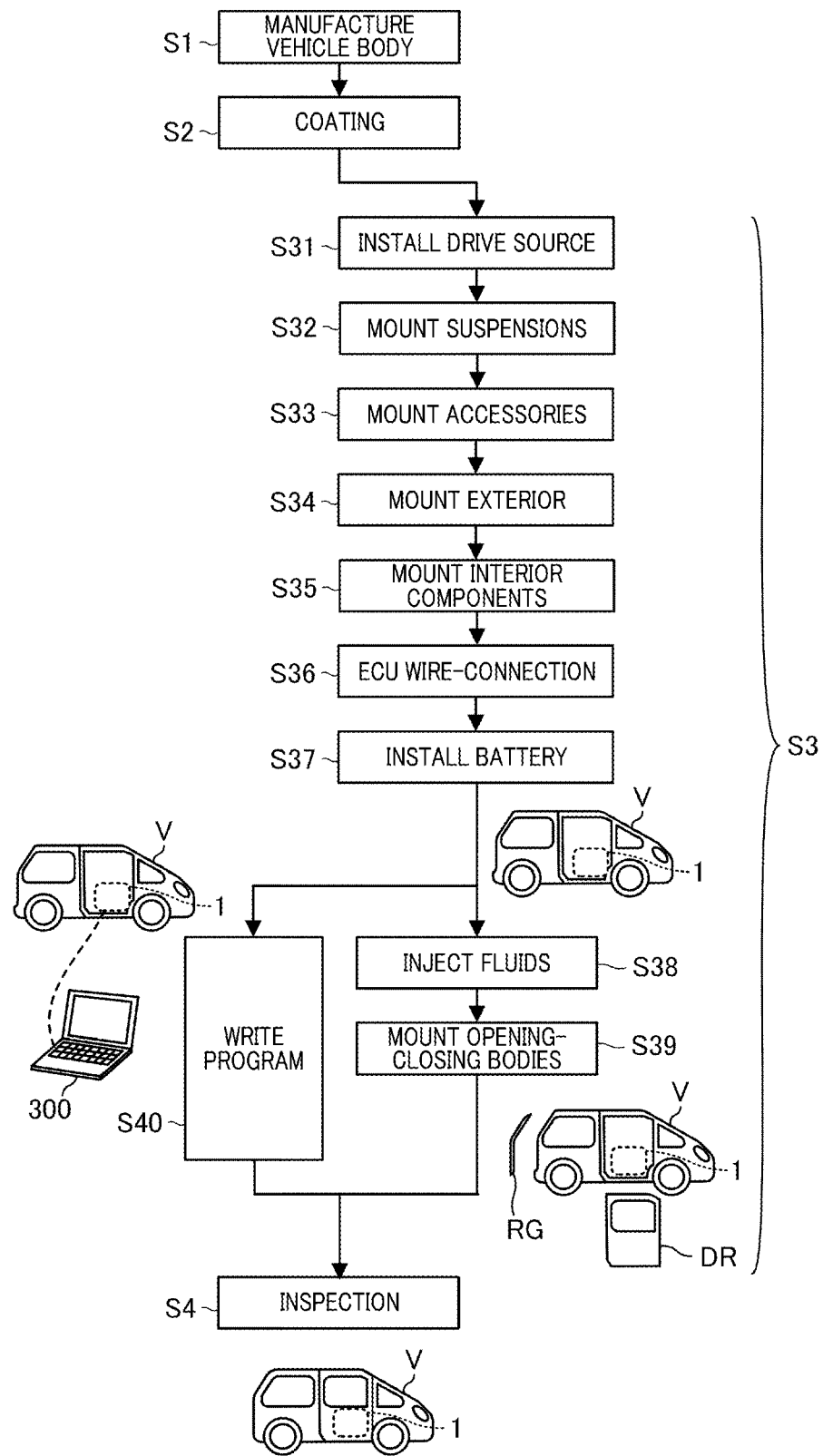
FIG. 2 is an explanatory diagram of manufacturing steps of a vehicle.

A specific form of the vehicle in which the vehicle control system 1 is installed is not limited. The vehicle may be a four-wheeled automobile or may be a motorcycle or another moving body. The vehicle may be a vehicle which uses an internal combustion engine as a drive source, may be an electric vehicle which uses a motor as a drive source, or may be a hybrid vehicle which uses an internal combustion engine and a motor. In the present embodiment, as illustrated in FIG. 2, a description will be made about a vehicle V, which is a four-wheeled automobile, as an example.

The following description explains examples of various ECUs 50 which are installed in the vehicle V and apparatuses which are controlled by the ECUs 50. It is not intended that the ECUs 50 included in the vehicle V as an application target of the present disclosure are limited to a manner of connection illustrated in FIG. 1.

The vehicle control system 1 includes a central ECU 2 which performs general control of the vehicle V and information processing. The central ECU 2 is connected with communication lines including communication wires B1 to B6. The central ECU 2 realizes a function of a gateway which manages delivery and acceptance of communication data among those communication lines. The central ECU 2 executes writing of programs to be executed by the ECUs for the ECUs which are connected with the central ECU 2 by the communication wires B1 to B6 and for the ECUs which are connected with the above ECUs by other communication wires B7 to B14. Writing of a program includes update of a program which is already written in the ECU and newly writing a program in the ECU. The central ECU 2 executes over-the-air (OTA) management, for example. The OTA management includes control about a process of downloading an update program for the ECU included in the vehicle V from a server on the outside of the vehicle and about a process of applying a downloaded update program to an in-vehicle device, for example. The central ECU 2 corresponds to one example of a master control unit in the present disclosure, and each of the ECUs to which a program is written by the central ECU 2 corresponds to one example of a vehicle control unit. The vehicle control unit includes a zone-A ECU 11, a zone-B ECU 13, and the ECUs 50 illustrated in FIG. 1, for example.

Figure 3:
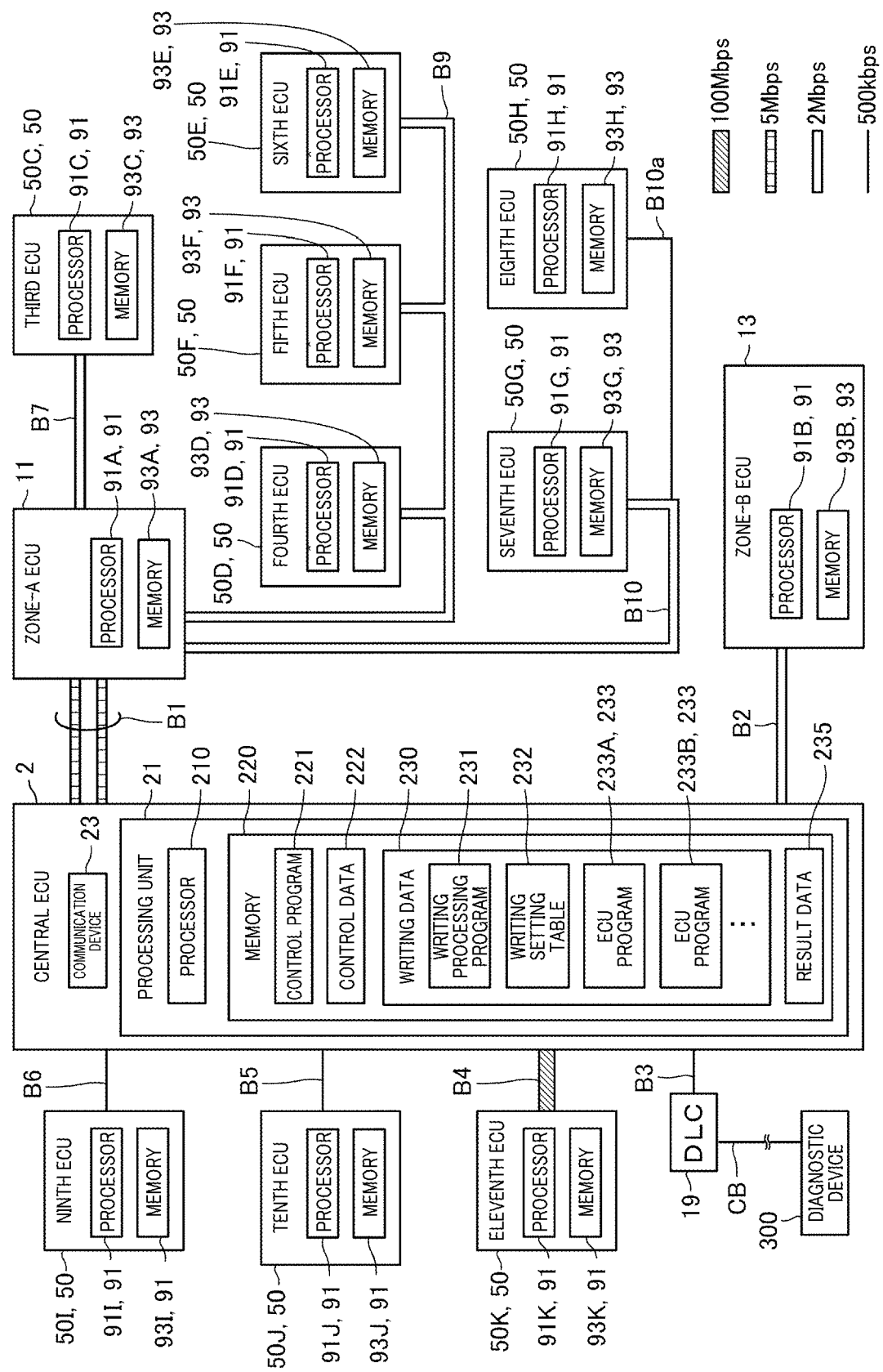
FIG. 3 is a block diagram illustrating a principal component configuration of the vehicle control system.

In FIG. 1 and FIG. 3 described later, each of various ECUs which are connected with the central ECU 2, the zone-A ECU 11, and the zone-B ECU 13 is denoted as ECU 50.

With the central ECU 2, the zone-A ECU 11 is connected by the communication wire B1, and the zone-B ECU 13 is connected by the communication wire B2. As described later, in addition, plural ECUs 50 are connected with the zone-A ECU 11 and the zone-B ECU 13. The zone-A ECU 11 manages delivery and acceptance of communication data between the central ECU 2 and the ECUs 50 which are connected with the zone-A ECU 11. The zone-B ECU 13 manages delivery and acceptance of communication data between the central ECU 2 and the ECUs 50 which are connected with the zone-B ECU 13.

With the central ECU 2, a data link connector (DLC) 19 is connected by the communication wire B3. The DLC 19 is an interface device which connects external devices of the vehicle V with the central ECU 2. The DLC 19 includes a connector with which a communication cable is connectable and is connected with a diagnostic device 300, for example, via the communication cable CB. The DLC 19 corresponds to one example of a connection unit in the present disclosure.

The diagnostic device 300 is a terminal device which has a processor, and which is used by a worker in manufacturing steps of the vehicle V. The diagnostic device 300 is connected with the DLC 19 by the communication cable CB, for example. The diagnostic device 300 performs transmission and reception of various commands and data to and from the vehicle control system 1, thereby acquires information about the vehicle control system 1, and transmits an instruction to the vehicle control system 1. The diagnostic device 300 includes operation units such as keys and switches which are operated by the worker, a display unit which displays an action state of the diagnostic device 300 and information about the vehicle control system 1, a connector for connecting with the communication cable CB, and so forth. The diagnostic device 300 corresponds to one example of an external device in the present disclosure.

With the central ECU 2, plural ECUs 50 are connected by the communication wires B4, B5, and B6. Those ECUs 50 include a vehicle-to-everything (V2X) communication device, for example. The V2X communication device is a communication device that includes a communication antenna and a communication circuit, which are not illustrated, and that has a wireless communication function and performs vehicle-to-vehicle communication or road-to-vehicle communication in accordance with control by the central ECU 2. The ECUs 50 which are connected with the central ECU 2 may include a telematics control unit (TCU). The TCU is a wireless communication device that includes a communication antenna and a communication circuit, which are not illustrated, and that executes wireless data communication by a cellular communication system such as long-term evolution (LTE) or the fifth-generation mobile communication system (5G). The ECUs 50 which are connected with the central ECU 2 may include an in-vehicle infotainment (IVI) ECU. With the IVI-ECU, in-vehicle apparatuses such as an automotive navigation system, various cameras including a rear camera, an audio player, a monitor, a touch panel, operation elements such as keys and switches, a speaker, and a microphone are connected. The IVI-ECU controls the in-vehicle apparatuses and thereby provides various kinds of information and entertainment for an occupant of the vehicle V. For example, the IVI-ECU executes control such as starts and stops of the in-vehicle apparatuses, control for outputting data and so forth, which are detected by a sensor by the other ECU, and so forth.

The ECUs 50 which are connected with the central ECU 2 may include a driving assistance ECU which executes control for automatically parking the vehicle V at a parking position or an assistance function in a case where a driver parks the vehicle V. Function units as control targets of the driving assistance ECU include various cameras, a monitor, a touch panel, a steering device, a brake mechanism, and an acceleration device, which are installed in the vehicle V, for example.

The DLC 19 is one example of a function unit which is controlled by the central ECU 2. The same applies to the V2X communication device and the TCU.

With the zone-A ECU 11, plural ECUs 50 are connected by the communication wires B7 to B10. The ECUs 50 which are connected with the zone-A ECU 11 include a fuel injection (FI) control unit, a motor control unit, a battery (BATT) control unit, a shift control unit, a vehicle stability assist (VSA) control unit, and so forth, for example. The ECUs 50 which are connected with the zone-A ECU 11 by the communication wires B7 to B10 can be considered to be function units as control targets of the zone-A ECU 11.

The FI control unit controls a fuel injection amount and a fuel injection timing in an internal combustion engine which is installed in the vehicle V. Function units as control targets of the FI control unit include an electronic control fuel injection device and may include sensors. As sensors, an O2 sensor, a knock sensor, a cam angle sensor, a crank angle sensor, an intake air temperature sensor, an exhaust gas temperature sensor, and so forth can be raised. The motor control unit controls a rotation speed of a motor which is installed in the vehicle V. Function units as control targets of the motor control unit include an inverter circuit which supplies a driving current to the motor and may include various sensors. The BATT control unit performs charge control, discharge control, and management of a remaining charge amount for a traveling battery which is installed in the vehicle V. A battery as a function unit as a control target of the BATT control unit is a battery that is separately provided from a starting battery which supplies power to each unit of the vehicle control system 1 and is installed in the vehicle V for supplying a driving power source for the motor. The traveling battery may be a lithium-ion secondary battery, a lithium polymer battery, a nickel-metal hydride battery, a solid-state battery, another secondary battery, or a capacitor. Function units as control targets of the BATT control unit may include a regenerative mechanism which generates regenerative power by traveling energy of the vehicle V. Meanwhile, the starting battery of the vehicle V is a secondary battery which supplies power to each unit of the vehicle control system 1 in a state where a power source of the vehicle V is turned off and is charged by a generating device installed in the vehicle V during travel of the vehicle V. For example, the starting battery is formed from a lead-acid battery, another secondary battery, or a capacitor.

The shift control unit controls a shift mechanism of the vehicle V in accordance with a traveling state of the vehicle V and an operation by the driver. Function units as control targets of the shift control unit include the shift mechanism of the vehicle V, and specifically, a step automatic transmission (AT), a continuously variable transmission (CVT), a dual clutch transmission (DCT), or the like is raised. The function units as the control targets of the shift control unit may include a shift position sensor, a shift switch, a shift lever, and so forth.

A function unit as a control target of the VSA control unit is an actuator provided to a brake mechanism of the vehicle V, for example. The VSA control unit causes the actuator of the brake mechanism to act in accordance with a posture or the like of the vehicle V and thereby stabilizes the posture of the traveling vehicle V, and in advance prevents a slip and a spin, for example.

With the zone-B ECU 13, plural ECUs 50 are connected by the communication wires B11 to B14. The ECUs 50 which are connected with the zone-B ECU 13 includes a light control unit and an entry control unit, for example. The ECUs 50 which are connected with the zone-B ECU 13 by the communication wires B11 to B14 can be considered to be function units as control targets of the zone-B ECU 13.

Function units as control targets of the light control unit are lamp bodies which are installed in the vehicle V, that is, lighting devices. For example, the control targets of the light control unit include headlights, direction indicators, fog lamps, brake lights, and reversing lights. The light control unit may control a lamp body, which illuminates an inside of a vehicle cabin of the vehicle V, as a control target. A function unit as a control target of the entry control unit is a wireless communication device which performs wireless communication with a key with a fob or another electronic key of the vehicle V. The entry control unit executes communication with the key of the vehicle V, thereby processes user access to the vehicle control system 1 from the outside of the vehicle, and realizes an action of so-called smart entry.

The communication wires B1 to B14 are formed from plural communication transmission paths which conform to various communication standards. Each of the communication wires B1 to B14 can be provided as a data transmission path which conforms to a different communication standard. That is, a specific configuration, a transmission band, and a communication standard of a cable that constitutes each of the communication wires B1 to B14 are arbitrarily selected. As communication standards which are applicable to the communication wires B1 to B14, for example, a controller area network (CAN), Ethernet®, a universal serial bus (USB), a local interconnect network (LIN), and a low-voltage differential signaling (LVDS) can be raised, but other standards may be used. The communication wires B1 to B6 are illustrated, in FIG. 1, as independent communication lines, but their specific configurations are not restricted, and for example, the communication wires B1 to B6 may be bus communication lines, which are connected with plural apparatuses, similarly to the communication wires B7 to B14.

FIG. 2 is an explanatory diagram of the manufacturing steps of the vehicle V. FIG. 2 is a diagram which illustrates an outline of the manufacturing steps of a four-wheeled automobile while dividing the outline based on principal contents but does not limit details of the manufacturing steps of devices of the vehicle. For example, a step indicated as one step in FIG. 2 may include plural detailed steps. The order of steps which is illustrated in FIG. 2 may appropriately be switched. As for manufacturing of the vehicle V, performance of a step which is not illustrated in FIG. 2 is not excluded.

The steps illustrated in FIG. 2 indicate steps of a main manufacturing line in a manufacturing factory of the vehicle V in a simplified manner, for example. In the manufacturing steps of the vehicle V, other steps in a so-called sub-line, which is different from the main manufacturing line, may be conducted, and although other steps may be conducted in another manufacturing factory or component factory, those steps are skipped in FIG. 2.

Step S1 denotes a vehicle body manufacturing step. In the vehicle body manufacturing step, various treatments such as pressing and welding are performed for row materials such as steel and aluminum materials or for structure components which are manufactured in another factory. In step S1, a vehicle body of the vehicle V, a so-called frame is manufactured.

Step S2 denotes a coating step. In the coating step, coating for the vehicle body manufactured in step S1 is performed.

Step S3 denotes an assembling step. In the assembling step, exterior components, interior components, driving system components, and other various components are mounted on the vehicle body for which coating is performed in the coating step. Following step S3, in step S4, an inspection step is performed. In the inspection step in step S4, a completion inspection of the vehicle V is performed.

In FIG. 2, the assembling step in step S3 is more specifically illustrated.

The assembling step includes a drive source installation step (step S31), a suspension mounting step (step S32), an accessory mounting step (step S33), an exterior mounting step (step S34), an interior component mounting step (step S35), an ECU wire-connection step (step S36), and a battery installation step (step S37).

In the drive source installation step (step S31), an internal combustion engine and/or a motor as drive sources of the vehicle V are mounted on the vehicle body. In manufacturing the vehicle V having the internal combustion engine, in step S31, components of an intake system and an exhaust system which are connected with the internal combustion engine are mounted. In manufacturing the vehicle V in which the motor is installed, in step S31, the traveling battery is mounted. In step S31, a transmission may be mounted together with the drive source. In step S31, a part or all of the ECUs 50 to be connected with the drive source are installed in the vehicle body. For example, in step S31, the ECUs 50 such as the FI control unit, the motor control unit, the BATT control unit, and the shift control unit may be installed in the vehicle body.

In the suspension mounting step (step S32), a suspension mechanism which is assembled in a sub-line is mounted on the vehicle body.

In the accessory mounting step (step S33), accessories of the vehicle V are mounted. The accessories include a compressor, a condenser, refrigerant piping, an alternator, a cooling water pump, a cooling water tank, cooling water piping, and an electric oil pump, which constitute an air-conditioning device, for example, and may include other components. In the accessory mounting step, installation, connection, and so forth of brake fluid piping may be performed.

In the suspension mounting step and the accessory mounting step, a part or all of the ECUs 50 to be connected with suspensions and accessories are installed in the vehicle body. In the suspension mounting step and the accessory mounting step, the ECU 50 such as the VSA control unit may be installed in the vehicle body.

In the exterior mounting step (step S34), exterior components such as bumpers, glass other than door glass, wipers, and lamp bodies are mounted. In the interior component mounting step (step S35), interior components of the vehicle V are mounted. The interior components include seats and a center console. In the interior component mounting step, a monitor or a touch panel of an automotive navigation system, a meter panel, and various cameras are mounted on the vehicle body.

In the exterior mounting step and the interior component mounting step, a part or all of the ECUs 50 to be connected with the exterior components and so forth are installed in the vehicle body. For example, in the exterior mounting step or the interior component mounting step, the ECUs 50 such as the light control unit and the entry control unit may be installed in the vehicle body.

In the ECU wire-connection step (step S36), the central ECU 2, the zone-A ECU 11, and the zone-B ECU 13 are installed in the vehicle body. In addition, in the ECU wire-connection step, the ECUs 50, which are not installed in steps S31 to S35, among the ECUs 50 which constitute the vehicle control system 1 are installed in the vehicle body. In the ECU wire-connection step, wire-connection of the communication wires B1 to B6 is made with the central ECU 2. For example, wire-connection of the communication wires B1 to B6 is made with one or plural connectors, and in the ECU wire-connection step, the connectors are connected with the central ECU 2. In addition, in the ECU wire-connection step, the communication wires B7 to B10 are connected with the zone-A ECU 11, and the communication wires B11 to B14 are connected with the zone-B ECU 13. By the ECU wire-connection step, the central ECU 2, the zone-A ECU 11, and the zone-B ECU 13 are mutually connected with the apparatuses as the control targets and the ECUs 50, and a state is established where control by the central ECU 2 is possible. That is, all of the ECUs 50 which have to be directly connected with the central ECU 2 and the ECUs 50 which have to be connected with the central ECU 2 via the zone-A ECU 11 and the zone-B ECU 13 are connected in the ECU wire-connection step. In the ECU wire-connection step, in a state where the vehicle control system 1 is not energized, a connection test may be performed which is for checking electrical connection states between the central ECU 2 and the various ECUs 50 which are connected with the central ECU 2.

By a wire-connection step of the ECU wire-connection step, the central ECU 2, the zone-A ECU 11, and the zone-B ECU 13 are mutually connected with the apparatuses as the control targets and the ECUs 50, and a state is established where control by the central ECU 2 is possible.

The ECU wire-connection step in step S36 corresponds to one example of a wire-connection step in the present disclosure. Because the central ECU 2 and the ECUs 50 are installed in steps S31 to S36, those steps correspond to one example of a providing step in the present disclosure.

After the ECU wire-connection step (step S36), in the battery installation step (step S37), the starting battery is installed in the vehicle V. Wire-connection of the starting battery is made with the vehicle control system 1 in the ECU wire-connection step. As described above, the starting battery supplies power to the vehicle control system 1. Power of the starting battery is supplied as a power source for at least the central ECU 2, the zone-A ECU 11, and the zone-B ECU 13. After step S37, the vehicle control system 1 is started by power supplied by the starting battery and is set to a state where each unit of the vehicle control system 1 is capable of executing control. Specifically, after the step S37, the diagnostic device 300 is connected with the DLC 19, and the diagnostic device 300 is thereby capable of executing communication with the central ECU 2.

After the battery installation step (step S37), a fluid injection step (step S38) and an opening-closing body mounting step (step S39) are performed for the vehicle V. In step S38, various liquids used for the vehicle V are injected. For example, in step S38, cooling water is injected into a water-cooling mechanism which cools the drive source of the vehicle V. A brake fluid is injected into brake piping of the vehicle V. In the fluid injection step, other liquids may be injected.

In step S38, opening-closing bodies of the vehicle V are mounted. As the opening-closing bodies, for example, doors DR and a rear gate RG are raised. In step S38, the assembling step (step S3) is completed, and the inspection step in step S4 is executed.

Step S37 corresponds to one example of an injection step in the present disclosure, and step S38 corresponds to one example of an opening-closing body mounting step in the present disclosure.

In the manufacturing steps of the vehicle V of the present disclosure, in parallel with steps S38 and S39, a program writing step (step S40) is executed. Step S40 corresponds to one example of a writing step in the present disclosure.

The program writing step is started after the battery installation step (step S37) and before the fluid injection step (step S38) or after the fluid injection step. The program writing step may be finished before the opening-closing body mounting step (step S39) is started or may be continued to be executed after the opening-closing body mounting step (step S39) is started.

In the program writing step, the central ECU 2 writes programs to the ECUs 50 included in the vehicle control system 1. Targets of the program writing step include the ECUs 50 which are connected with the central ECU 2 by the communication wires B4 to B6, the ECUs 50 which are connected with the zone-A ECU 11 by the communication wires B7 to B10, and the ECUs 50 which are connected with the zone-B ECU 13 by the communication wires B11 to B14. In the program writing step, programs may be written to the zone-A ECU 11 and the zone-B ECU 13.

As illustrated in FIG. 1, the vehicle control system 1 has a cascade structure in which plural ECUs are hierarchically connected. That is, the vehicle control system 1 includes ECUs 50 which are directly connected with the central ECU 2 by the communication wires B1 to B6 and ECUs 50 which are connected with the central ECU 2 via other ECUs. Among those, the ECU 50 which is connected with the central ECU 2 via the other ECU will be referred to as secondary control unit.

The secondary control unit includes the ECUs 50 which are connected with the zone-A ECU 11 by the communication wires B7 to B10. The secondary control units include the ECUs 50 which are connected with the zone-B ECU 13 by the communication wires B11 to B14. The communication wires B7 to B10 which connect the zone-A ECU 11 with the secondary control units and the communication wires B11 to B14 which connect the zone-B ECU 13 with the secondary control units will be referred to as lower-level communication wires.

Meanwhile, the ECU which is directly connected with the central ECU 2 and is arranged between the secondary control unit and the central ECU 2 will be referred to as primary control unit. The primary control units include the zone-A ECU 11 and the zone-B ECU 13. The communication wires B1 and B2 which connect the central ECU 2 with the primary control units will be referred to as higher-level communication wires.

FIG. 3 is a block diagram illustrating a principal component configuration of the vehicle control system 1.

For explaining writing of programs in the vehicle control system 1, a configuration of a part of the ECUs which constitute the vehicle control system 1 is illustrated in FIG. 3.

That is, FIG. 3 illustrates the zone-A ECU 11 and the zone-B ECU 13 as examples of the primary control units and a third ECU 50C, a fourth ECU 50D, a fifth ECU 50E, a sixth ECU 50F, a seventh ECU 50G, and an eighth ECU 50H as examples of the secondary control units. For example, those are the FI control unit, the motor control unit, the BATT control unit, the shift control unit, and the VSA control unit. FIG. 3 illustrates a ninth ECU 50I, a tenth ECU 50J, and an eleventh ECU 50K as the ECUs 50 which are connected with the central ECU 2. Those are the IVI-ECU, the TCU, the V2X communication device, and so forth, for example.

As illustrated in FIG. 3, the central ECU 2 has a processing unit 21 and a communication device 23. The communication device 23 executes communication via the communication wires B1 to B6 in accordance with control by the processing unit 21.

The processing unit 21 includes a processor 210 and a memory 220.

The processor 210 is formed from a central processing unit (CPU), a micro-controller unit (MCU), or a microprocessor unit (MPU), for example. The memory 220 is a rewritable non-volatile storage device and stores programs which are executed by the processor 210 and data which are processed by the processor 210. The memory 220 is formed from a semiconductor storage device such as a flash read-only memory (ROM) or a solid state disk (SSD) or a magnetic storage device, for example. The memory 220 may include a random access memory (RAM) which forms a work area for temporarily storing programs and data. The processing unit 21 may be formed from an integrated circuit (IC) which integrally includes the processor 210 and the memory 220. The central ECU 2 may be an integrated circuit in which the processing unit 21 and the communication device 23 are united. The central ECU 2 may be configured to include the communication device 23, the processor 210, and the memory 220 as pieces of independent hardware.

The memory 220 stores a control program 221, control data 222, writing data 230, and result data 235.

The control program 221 is a program which is executed by the processor 210. The control data 222 are data which are referred to in a case where the processor 210 executes the control program 221. The processor 210 executes the control program 221 based on the control data 222 and thereby executes management and control of delivery and acceptance of data in the vehicle control system 1 and communication by the DLC 19. The processor 210 executes the control program 221 and thereby controls the V2X communication device, the TCU, the meter panel, and so forth. The processor 210 executes the control program 221 and thereby controls the OTA management of the ECUs 50 which constitute the vehicle control system 1. The memory 220 corresponds to one example of a master storage unit in the present disclosure.

A configuration of the ECU as a writing target will be described. FIG. 3 illustrates the zone-A ECU 11, the zone-B ECU 13, the third ECU 50C, the fourth ECU 50D, the fifth ECU 50E, the sixth ECU 50F, the seventh ECU 50G, and the eighth ECU 50H as examples of the ECUs as the writing targets of the central ECU 2.

The zone-A ECU 11 includes a processor 91A and a memory 93A. The zone-B ECU 13 includes a processor 91B and a memory 93B. Similarly, the third ECU 50C includes a processor 91C and a memory 93C, the fourth ECU 50D includes a processor 91D and a memory 93D, and the fifth ECU 50E includes a processor 91E and a memory 93E. The sixth ECU 50F includes a processor 91F and a memory 93F, the seventh ECU 50G includes a processor 91G and a memory 93G, and the eighth ECU 50H includes a processor 91H and a memory 93H. In the following, in a case where the processors 91A to 91H are not distinguished, those are denoted as processor 91. In a case where the memories 93A to 93H are not distinguished, those are denoted as memory 93. The memory 93 corresponds to one example of a program storage unit in the present disclosure.

The processor 91 is formed from a CPU, an MCU, or an MPU, for example. The memory 93 is a rewritable non-volatile storage device and stores programs which are executed by the processor 91 and data which are processed by the processor 91. The memory 93 is formed from a semiconductor storage device such as a flash ROM or an SSD or a magnetic storage device, for example. The memory 93 may include a RAM which forms a work area for temporarily storing programs and data. Each of the ECUs 50 may be formed from an integrated circuit which integrally includes the processor 91 and the memory 93.

The processor 91 executes a basic control program stored in the memory 93 and thereby executes communication with the central ECU 2. The processor 91 executes a control program stored in the memory 93 and thereby controls a function unit as a control target.

Before the program is written by the central ECU 2 in the program writing step, the memory 93 does not store the program for controlling the function unit as the control target by the processor 91. In this state, the memory 93 stores a program for executing a basic action by the processor 91. For example, before a writing process, the memory 93 stores a program, by which the processor 91 executes communication with the central ECU 2 and executes a process illustrated in FIG. 6. For example, before the program writing step, the memory 93 may already store the program for controlling the function unit as the control target by the processor 91. In this case, in the program writing step, a part of the program stored in the memory 93 is overwritten and updated.

The zone-A ECU 11 may include a communication device which executes communication by the communication wires B1, B7 to B10 in addition to the processor 91A and the memory 93A. The zone-B ECU 13 may include a communication device which executes communication by the communication wires B2, B11 to B14 in addition to the processor 91B and the memory 93B. Each of the ECUs other than the zone-A ECU 11 and the zone-B ECU 13 may be configured to include a communication device which is not illustrated and performs data communication with the zone-A ECU 11 or the zone-B ECU 13 and performs transmission and reception of a signal to and from the function unit as the control target.

The writing data 230 which are stored in the memory 220 by the central ECU 2 are data for writing programs to the ECUs 50 of the vehicle control system 1 by the processor 210. The writing data 230 include a writing processing program 231, a writing setting table 232, and an ECU program 233.

The writing processing program 231 is a program which is executed by the processor 210. The processor 210 executes the writing processing program 231 and thereby executes writing of a program to the ECU 50 in the manufacturing steps of the vehicle V.

The writing setting table 232 includes information about the ECUs 50 as targets to which programs are written by the central ECU 2. The writing setting table 232 associates the ECU 50 as the target of the writing process to be executed by the central ECU 2 with the ECU program 233 to be written to the memory 93 provided to the ECU 50. The writing setting table 232 corresponds to one example of association data.

The writing setting table 232 includes a model number of the ECU 50 as information about the ECU 50 as the target to which the program is written by the central ECU 2. The writing setting table 232 may include information which indicates a specification and a destination of the ECU 50 in addition to the model number of the ECU 50. The writing setting table 232 may include a manufacturing number (serial number) specific to the ECU 50 or a manufacturing lot number of the ECU 50 together with the model number of the ECU 50.

The writing data 230 include plural ECU programs 233 which correspond to the respective ECUs 50 as writing targets. For example, an ECU program 233A is a program which corresponds to the zone-A ECU 11 and is written to the memory 93A. An ECU program 233B is a program which corresponds to the zone-B ECU 13 and is written to the memory 93B. Information which associates the ECU programs 233A and 233B with the zone-A ECU 11 and the zone-B ECU 13 is included in the writing setting table 232.

The number of ECU programs 233 included in the writing data 230 is not restricted. The writing data 230 preferably include the ECU programs 233 which correspond to all of the ECUs 50 of the vehicle control system 1 of the vehicle V in which the central ECU 2 is installed.

The ECU program 233 may be the same as a program which is written to the memory 93. The ECU program 233 may be stored in the memory 220 in a compressed state and be written to the memory 93 while being expanded by the processor 210.

FIG. 3 illustrates the communication wires B1 to B6, B7, B9, and B10 by different lines in accordance with respective communication speeds of standards. In the vehicle control system 1, the communication speeds and standards of the communication wires B1 to B14 are decided in accordance with functions of the ECUs. For example, the communication wire B1 conforms to a CAN with flexible data rate (CAN-FD) standard and is formed by bundling two communication paths whose communication speed in design is 5 Mbps. A form of bundling the communication paths can be made similar to teaming, for example, and communication control by link aggregation or load balancing is performed between the central ECU 2 and the zone-A ECU 11. For example, the central ECU 2 and the zone-A ECU 11 are capable of communicating with each other at a communication speed of 10 Mbps in design.

For example, the communication wire B4 conforms to an Ethernet standard, and its communication speed in design is 100 Mbps, for example. The communication wires B2, B7, B9, and B10 conform to the CAN-FD standard, and their communication speed in design is 2 Mbps. The eighth ECU 50H is connected with the communication wire B10, and the eighth ECU 50H is connected while conforming to an F-CAN standard. Thus, the eighth ECU 50H is, together with the seventh ECU 50G, connected with the communication wire B10 and executes F-CAN communication at a communication speed of 500 kbps, for example. This can be considered to be a situation where the eighth ECU 50H is connected with the zone-A ECU 11 by a low-speed communication wire. Thus, FIG. 3 illustrates a configuration in which the eighth ECU 50H is connected with a low-speed communication wire B10a. The communication wire B10a may actually be integral with the communication wire B10.

The communication wires B3, B5, and B6 are communication wires which conform to the F-CAN standard and whose communication speed in design is 500 kbps, for example.

Real transfer speeds, that is, effective speeds of the communication wires B1 to B14 of the vehicle control system 1 fall below speeds in design or standards. This phenomenon occurs due to an influence of overhead of frames or communication cycles. For example, based on experiments by the inventors, the effective speed of CAN-FD communication, which is at 5 Mbps in its standard, is approximately 1,450 to 900 kbps, and the effective speed of CAN-FD communication, which is at 2 Mbps in its standard, is approximately 900 to 700 kbps.

Consequently, the inventors have found a problem that in a case where the central ECU 2 writes the program to the ECU, an influence of the transfer speed between the ECUs of the vehicle control system 1 has to be taken into consideration.

Figure 4:
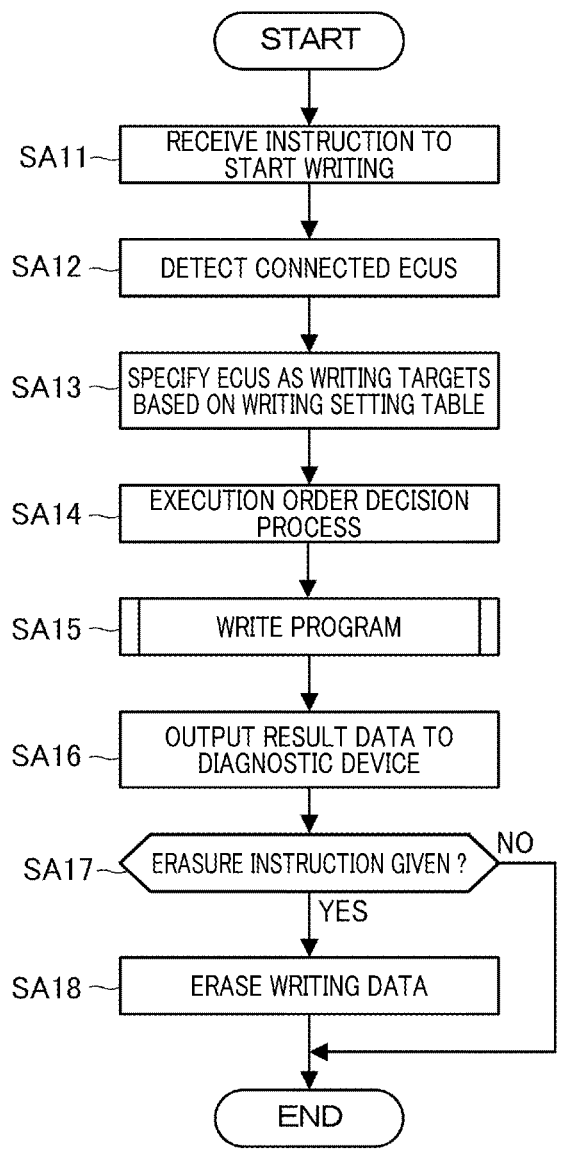
FIG. 4 is a flowchart illustrating actions of the vehicle control system.
Figure 5:
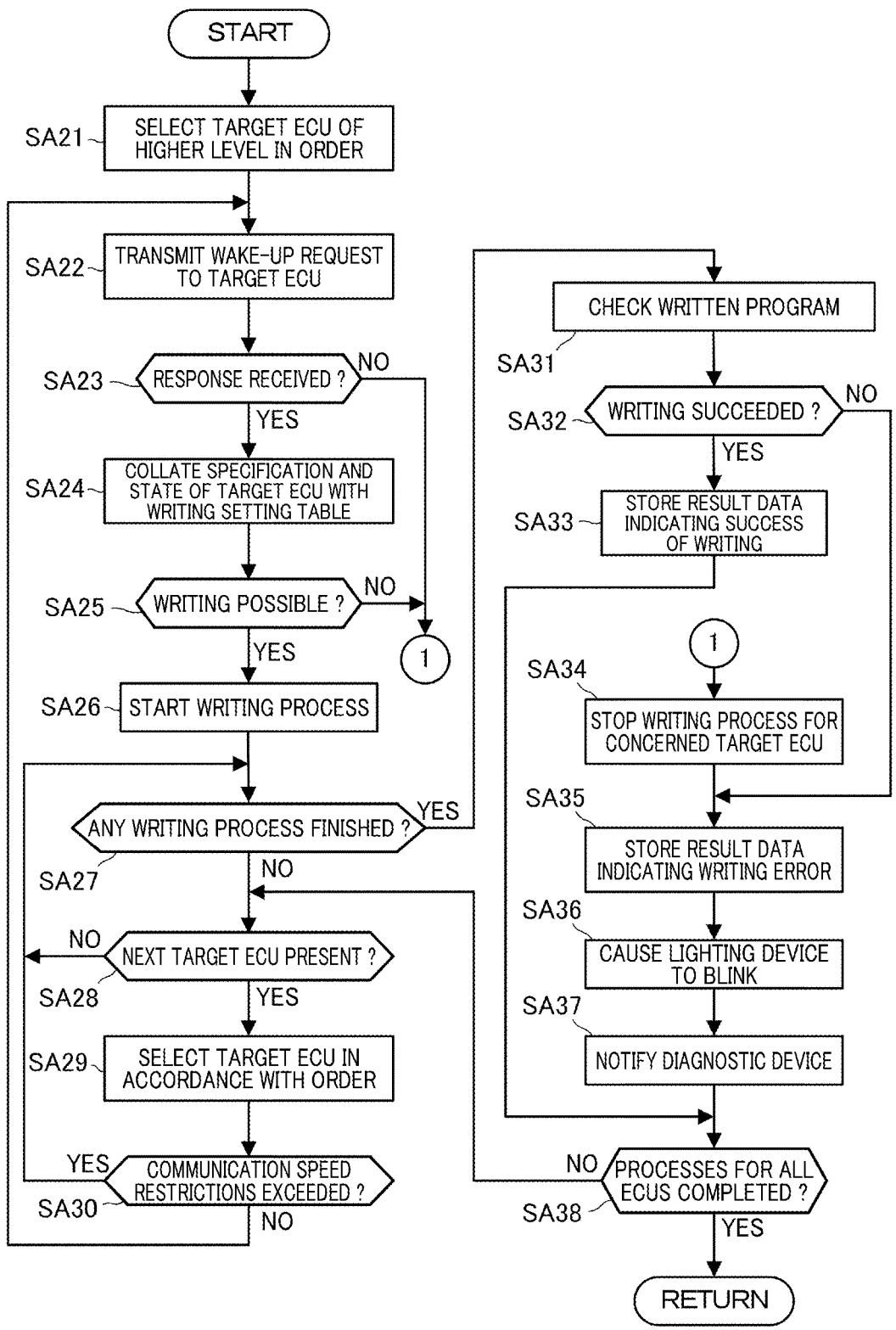
FIG. 5 is a flowchart illustrating actions of the vehicle control system.
Figure 6:
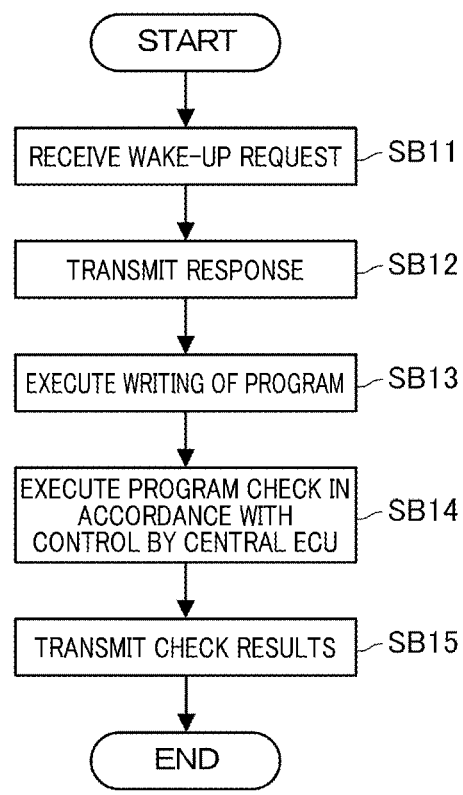
FIG. 6 is a flowchart illustrating actions of the vehicle control system.

FIG. 4, FIG. 5, and FIG. 6 are flowcharts illustrating actions of the vehicle control system 1. FIG. 4 and FIG. 5 illustrate actions of the central ECU 2, and FIG. 6 illustrates actions of a target ECU.

The actions illustrated in FIG. 4 are executed in a state where the diagnostic device 300 is connected with the DLC 19. Specifically, the worker operates the diagnostic device 300, and the diagnostic device 300 thereby transmits a command for instructing a start of the writing process to the vehicle control system 1. This command serves as a trigger for a start of the writing process.

The processor 210 receives the command from the diagnostic device 300 (step SA11) and detects the ECUs which are connected with the central ECU 2 (step SA12). In step SA12, the processor 210 detects the ECUs which are connected with the central ECU 2 by the communication wires B1 to B6 and further the ECUs which are connected with the central ECU 2 via the zone-A ECU 11 and the zone-B ECU 13.

The processor 210 specifies the ECUs set as targets of the writing process based on the writing setting table 232 (step SA13). The processor 210 can execute writing of programs to plural ECUs by using the writing data 230. In step SA13, among the ECUs detected in step SA12, all of the ECUs are specified which can be the targets of the writing process.

The processor 210 executes an execution order decision process for the ECUs specified in step SA13 and thereby decides order for performing the writing process (step SA14). Note that in the following, the ECU as the target of the writing process of writing the program will be referred to as target ECU.

The processor 210 decides writing order in accordance with a predetermined set condition. The predetermined condition is described in the writing setting table 232, for example.

The predetermined condition includes plural conditions.

A first condition is that among the ECUs included in the vehicle control system 1, the primary control unit is selected as the target ECU in preference to the secondary control unit.

A second condition is that in a case where the target ECU is selected from plural primary control units, the primary control unit with which more secondary control units are connected is preferentially selected as the target ECU. For example, the number of secondary control units which are connected with the zone-A ECU 11 illustrated in FIG. 1 is 12, and the number of secondary control units which are connected with the zone-B ECU 13 is 10. In this case, the zone-A ECU 11 is earlier selected as the target ECU than the zone-B ECU 13.

A third condition is that plural ECUs are selected as target ECUs and processes of writing programs are in parallel performed for the plural target ECUs.

A fourth condition is that it is possible to in parallel write programs to a first primary control unit, which is connected with a first higher-level communication wire, and to a second primary control unit, which is connected with a second higher-level communication wire, or the secondary control unit, which is connected with the second primary control unit by the lower-level communication wire. For example, in a case where the first higher-level communication wire is the communication wire B1, the first primary control unit is the zone-A ECU 11. In this case, the second higher-level communication wire is the higher-level communication wire which is different from the communication wire B1 and is the communication wire B2, for example. In this case, the second primary control unit is the zone-B ECU 13. In this example, it is possible to in parallel write programs to the zone-A ECU 11 and to the secondary control unit which is connected with the zone-B ECU 13. As another example, the first higher-level communication wire can be set as the communication wire B2, the first primary control unit can be set as the zone-B ECU 13, the second higher-level communication wire can be set as the communication wire B1, and the second primary control unit can be set as the zone-A ECU 11. In this example, it is possible to in parallel write programs to the secondary control unit which is connected with the zone-A ECU 11 and to the zone-B ECU 13.

When the fourth condition is expressed in the opposite manner, in a case where the primary control unit is selected as the target ECU, the secondary control unit which is connected with the selected primary control unit by the lower-level communication wire is not selected as the target ECU to which the program is simultaneously written with writing to the primary control unit.

A fifth condition is that it is possible to in parallel write programs to a first secondary control unit, which is connected with a third primary control unit by a first lower-level communication wire, and to a second secondary control unit, which is connected with the third primary control unit by a second lower-level communication wire. For example, when the third primary control unit is the zone-A ECU 11, the first lower-level communication wire is any of the communication wires B7 to B10. In this example, it is possible to in parallel write programs to the secondary control unit which is connected with the communication wire B7 and to the secondary control unit which is connected with the communication wire B9. Similarly, it is possible to in parallel write programs to the secondary control unit which is connected with the communication wire B9 and to the secondary control unit which is connected with the communication wire B10. The same applies to a case where the third primary control unit is the zone-B ECU 13.

When the fifth condition is expressed in the opposite manner, plural secondary control units which are connected with one lower-level communication wire are not selected as the target ECUs to which programs are simultaneously written.

Sixth and seventh conditions are conditions which relate to communication speeds of the communication wires. The sixth condition is that in a case where the communication speed of a third higher-level communication wire, which connects the central ECU 2 with the third primary control unit, is larger than the sum of the communication speed of the first lower-level communication wire and the communication speed of the second lower-level communication wire, it is possible to execute, in parallel, the writing process for the first secondary control unit and for the second secondary control unit. For example, in a case where the third primary control unit is the zone-A ECU 11, the third higher-level communication wire is the communication wire B1. In this example, in a case where the first lower-level communication wire is the communication wire B7 and the second lower-level communication wire is the communication wire B9 and a case where the communication speed of the communication wire B1 is larger than the sum of the communication speeds of the communication wire B7 and the communication wire B9, writing of programs can in parallel be performed for the third ECU 50C and for the fourth ECU 50D.

The seventh condition is that in a case where writing of programs is in parallel performed for plural secondary control units, it is possible to in parallel write programs to the secondary control unit, which is connected by the lower-level communication wire with the highest communication speed, and to the secondary control unit, which is connected by the lower-level communication wire with the lowest communication speed. For example, in a range illustrated in FIG. 3, the lower-level communication wires with the highest speed are the communication wires B7, B9, and B10, and the lower-level communication wire with the lowest communication speed is the communication wire B10a. In this example, any of the third ECU 50C, the fourth ECU 50D, the fifth ECU 50E, the sixth ECU 50F, and the seventh ECU 50G is combined with the eighth ECU 50H, and writing of programs is in parallel performed.

In step SA14, the processor 210 decides order for selecting the ECUs, which are specified in step SA13, as the target ECUs such that the above first to seventh conditions are satisfied. In the writing setting table 232, the order for selecting the ECUs of the vehicle control system 1 as the target ECUs may in advance be described. That is, the order which satisfies the first to seventh conditions may be designated by the writing setting table 232. In this case, in step SA14, the processor 210 decides the order by referring to the writing setting table 232.

The processor 210 executes processes of writing programs to the ECUs of the vehicle control system 1 (step SA15). Detailed actions in step SA15 will be described later by referring to FIG. 5.

After writing of the programs is finished, the processor 210 outputs the result data 235 stored in the memory 220 to the diagnostic device 300 via the DLC 19 (step SA16).

The processor 210 determines whether or not an instruction to erase the writing data 230 is input from the diagnostic device 300 (step SA17). In a case where the instruction for erasure is input (YES in step SA17), the processor 210 erases the writing data 230 from the memory 220 (step SA18) and finishes the current process. In a case where the instruction for erasure is not input (NO in step SA17), the processor 210 skips step SA18 and finishes the current process.

FIG. 5 in detail illustrates actions of the central ECU 2 in step SA15 in FIG. 4. The processor 210 selects one or plural target ECUs of higher levels in the order decided in step SA14 (step SA21). In the simplest example, the processor 210 selects one target ECU.

The processor 210 transmits the wake-up request to the target ECU (step SA22). The wake-up request is a signal to request the target ECU in a standby state to start. The target ECU is capable of receiving the wake-up request in a state where the power source is supplied by the starting battery. In a normal action, the target ECU transmits a response to the wake-up request to the central ECU 2 as described later by referring to FIG. 6.

The processor 210 determines whether or not the response to the wake-up request is received from the target ECU (step SA23). In a case where the response is not received in a predetermined time period (NO in step SA23), the processor 210 proceeds to step SA34 which will be described later.

In a case where the response is received from the target ECU (YES in step SA23), the processor 210 collates at least either one of a specification and a state of the target ECU with the writing setting table 232 (step SA24). The specification of the target ECU indicates a model number of the target ECU, a destination of the target ECU, and a specification adapted to attached components of the vehicle V. The state of the target ECU means presence or absence of a program which is already stored in the memory 93 of the target ECU, a version of a program, and so forth. The writing setting table 232 includes information which designates the specification and/or the state of the target ECU, to which the ECU program 233 is capable of being written, for each of the ECUs which can be the target ECUs. The processor 210 causes the target ECU to transmit information which indicates the specification and the state, for example, and thereby performs collation in step SA24.

The processor 210 determines whether or not writing of the program to the target ECU is possible as a result of the collation in step SA24 (step SA25). In a case where it is determined that writing is not possible (NO in step SA25), the processor 210 proceeds to step SA34 which will be described later.

In a case where it is determined that writing is possible (YES in step SA25), the processor 210 starts the writing process of writing the program to the memory 93 provided to the target ECU (step SA26). The writing process is a process in which the processor 210 writes the ECU program, which is associated with the target ECU by the writing setting table 232, to the memory 93 of the target ECU or updates the program written to the memory 93.

The processor 210 determines whether or not any of one or plural writing processes which are executed is finished (step SA27). In other words, it is determined whether or not the target ECU for which the writing process is completed is present among one or plural target ECUs for which the writing processes are executed. In a case where it is determined that the writing process is not finished (NO in step SA27), the processor 210 determines whether or not the target ECU to be next selected is present (step SA28). In step SA28, it is determined whether or not the ECU which is not selected as the target ECU is present among the ECUs which are placed in the order in step S14.

In a case where the target ECU to be next selected is not present (NO in step SA28), the processor 210 returns to step SA27.

In a case where it is determined that the target ECU to be next selected is present (YES in step SA28), the processor 210 selects the next target ECU in accordance with the order decided in step SA14 (step SA29).

In a case where the writing process which is presently executed and the writing process for the target ECU selected in step SA29 are in parallel performed, the processor 210 determines whether or not a threshold value of the communication speed is exceeded (step SA30). The determination in step SA30 is a determination about whether or not the above case complies with the above-described sixth condition and seventh condition. For example, the processor 210 determines whether or not the sum of the communication speed, at which the target ECU for which the writing process is executed communicates with the central ECU 2, and the communication speed, at which the target ECU selected in step SA29 communicates with the central ECU 2, is equivalent to or more than the threshold value. In this example, the processor 210 determines whether or not the target ECUs for which writing of programs is in parallel performed exceed restrictions about the communication speeds of the communication wires. For example, in a case where writing of programs is in parallel performed for the third ECU 50C and the fourth ECU 50D, the communication wire B7 and the communication wire B9 are used for communication between the central ECU 2 and the target ECUs. In this example, when the sum of the communication speed of the communication wire B7 and the communication speed of the communication wire B9 is large, the communication speed of the communication wire B1 becomes a bottleneck, or a communication load to the central ECU 2 becomes excessively large. In such a case, the processor 210 postpones a start of the writing process for the target ECU. Threshold values are values which are set about the communication speeds of plural lower-level communication wires and are included in the writing setting table 232. In step SA30, the processor 210 may determine whether or not the above case complies with the first to fifth conditions.

In a case where it is determined that the communication speed exceeds the restrictions (YES in step SA30), the processor 210 returns to step SA27. In a case where it is determined that the communication speed does not exceed the restrictions (NO in step SA30), the processor 210 proceeds to step SA22 and performs the process for the target ECU selected in step SA29.

On the other hand, in a case where it is determined that any of the writing processes which are executed is finished (YES in step SA27), the processor 210 checks the program written to the memory 93 (step SA31). In step SA31, the processor 210 may instruct the target ECU to check the program, and the target ECU may thereby execute a check. The processor 210 may read out the program written to the memory 93 and thereby execute the check.

The processor 210 determines whether or not writing of the program is normally completed based on results of the check in step SA31 (step SA32).

In a case where it is determined that writing of the program is not normally completed (NO in step SA32), the processor 210 proceeds to step SA35 which will be described later.

In a case where it is determined that writing of the program is normally completed (YES in step SA32), the processor 210 generates the result data 235 which indicate success of writing and stores the result data 235 in the memory 220 (step SA33). The result data 235 are data including information which indicates the target ECU and information which indicates that writing has succeeded. Subsequently, the processor 210 proceeds to step SA38.

In step SA34, the processor 210 stops the writing process for the target ECU which has been selected (step SA34). Next, in step SA35, the processor 210 generates the result data 235 which indicate a writing error and stores the result data 235 in the memory 220 (step SA35). The result data 235 which are generated in step SA35 include information that indicates the target ECU which has been selected and information that indicates that writing has not succeeded.

The processor 210 further causes the lamp body installed in the vehicle V to blink (step SA36). In step SA36, for example, the processor 210 controls the light control unit which controls the lamp body and thereby causes the direction indicator of the vehicle V to blink. Accordingly, an occurrence of an error to writing of the program can be notified to the worker who is present along a manufacturing line of the vehicle V. Note that in a case where the writing process for the light control unit is executed, step SA36 is skipped.

The processor 210 notifies the occurrence of the error to writing of the program to the diagnostic device 300 via the DLC 19 (step SA37) and proceeds to step SA38. In step SA37, the processor 210 may transmit a signal, which indicates the occurrence of the error to writing of the program, to the diagnostic device 300.

Alternatively, the processor 210 may transmit the result data 235 to the diagnostic device 300. In this case, an advantage can be obtained where the diagnostic device 300 displays contents of the result data 235 and the worker can thereby be informed of contents of the error in detail.

In step SA38, the processor 210 determines whether or not processes for all of the ECUs specified in step SA13 are completed (step SA38). In a case where it is determined that the processes for all of the ECUs are completed (YES in step SA38), the processor 210 returns to the process in FIG. 4.

In a case where it is determined that the processes for all of the ECUs are not completed (NO in step SA38), the processor 210 proceeds to step SA28.

FIG. 6 illustrates actions of the individual ECU which is selected as the target ECU. The processor 91 of the target ECU receives the wake-up request from the central ECU 2 (step SB11). The target ECU can receive the wake-up request in a state where the power source is supplied by the starting battery. After receiving the wake-up request, the processor 91 may execute initialization of each unit including the memory 93, transition among action modes for writing the program, and so forth.

The processor 91 transmits the response to the wake-up request to the central ECU 2 (step SB12).

Subsequently, the processor 91 executes writing of the program to the memory 93 in accordance with control by the central ECU 2 (step SB13). After writing of the program, the processor 91 executes a check of the program, which is written to the memory 93, in accordance with control by the central ECU 2 (step SB14), transmits check results to the central ECU 2 (step SB15), and finishes the current process. Note that as described above, in a case where the central ECU 2 executes the check of the program which is written to the memory 93, step SB15 is skipped.

As illustrated in FIG. 4 to FIG. 6, programs are in parallel written to plural ECUs of the vehicle control system 1 installed in the vehicle V, and the programs for the ECUs can thereby be written in a short time period in the manufacturing steps of the vehicle V.

Figure 7:
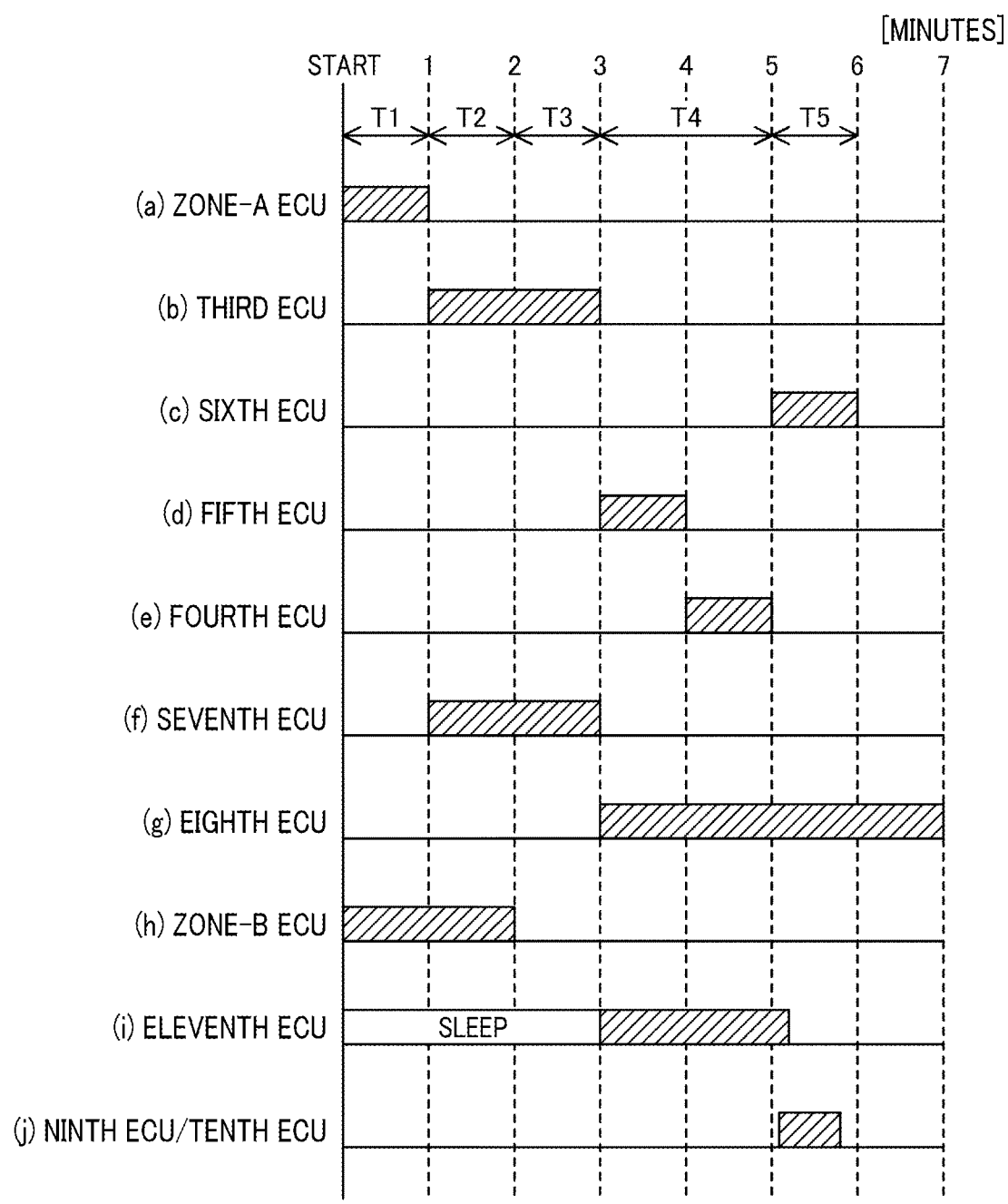
FIG. 7 is a timing chart illustrating actions of the vehicle control system.

FIG. 7 and FIG. 8 are timing charts which illustrate actions of the vehicle control system 1 and examples of actions for the ECUs illustrated as examples in FIG. 3. FIG. 7 and FIG. 8 illustrate action examples in cases where the ECUs included in the vehicle V are different. For example, FIG. 7 illustrates order of the writing process in a case where the present disclosure is applied to the vehicle V in which both of an internal combustion engine and a motor are installed as the drive sources for causing the vehicle V to travel. In this case, FIG. 8 illustrates order of the writing process in a case where the present disclosure is applied to the vehicle V which includes an internal combustion engine as the drive source but does not include a motor.

The horizontal axis in FIG. 7 represents a lapse of time, and FIG. 7 illustrates actions in seven minutes after a time point, at which the writing process for the first target ECU is started, as a starting point. A section (a) in FIG. 7 indicates the writing process for the zone-A ECU 11 and indicates a time period, in which the writing process is executed, by hatching. A section (b) in FIG. 7 indicates the writing process for the third ECU 50C, a section (c) in FIG. 7 indicates the writing process for the sixth ECU 50F, and a section (d) in FIG. 7 indicates the writing process for the fifth ECU 50E. A section (e) in FIG. 7 indicates the writing process for the fourth ECU 50D, a section (f) in FIG. 7 indicates the writing process for the seventh ECU 50G, and a section (g) in FIG. 7 indicates the writing process for the eighth ECU 50H. A section (h) in FIG. 7 indicates the writing process for the zone-B ECU 13, a section (i) in FIG. 7 indicates the writing process for the eleventh ECU 50K, and a section (j) in FIG. 7 indicates the writing process for the ninth ECU 50I or the tenth ECU 50J. Writing of programs to the ninth ECU 50I and the tenth ECU 50J is performed by a process which is commonly referred to as coding, for example.

The time required for the writing process for the zone-A ECU 11 is planned to be less than one minute and is planned to be one minute while including a margin. Similarly, a planned time period for the writing process for the third ECU 50C is two minutes, and each of the planned time periods for the sixth ECU 50F, the fifth ECU 50E, and the fourth ECU 50D is one minute. The planned time period for the writing process for the seventh ECU 50G is two minutes, and the planned time period for the writing process for the eighth ECU 50H is four minutes. The planned time period for the writing process for the zone-B ECU 13 is 2 minutes, the planned time period for the writing process for the eleventh ECU 50K is 2.2 minutes, and the planned time period for the coding for the ninth ECU 50I and the tenth ECU 50J is shorter than 1 minute. Each of those planned time periods includes a supplementary time period (margin). Thus, the writing process may actually be completed before the planned time period elapses. In this case, the central ECU 2 can start the writing process for the next target ECU before the planned time period elapses.

In the example in FIG. 7, the writing processes are first started for the zone-A ECU 11 and the zone-B ECU 13. The communication wires, by which data are transferred in a period T1 of one minute after the starts of the processes, are the communication wire B1 and the communication wire B2, and the total of the communication speeds of those communication wires is in a range of a load which the central ECU 2 is capable of processing.

After the writing process for the zone-A ECU 11 is finished, the central ECU 2 starts the writing processes for the third ECU 50C and the seventh ECU 50G. In a period T2 in FIG. 7, the writing processes for the zone-B ECU 13, the third ECU 50C, and the seventh ECU 50G are in parallel performed. The communication wires, by which data are transferred in the period T2, are the communication wire B2, the communication wire B7, the communication wire B10, and the communication wire B1. The sum of the communication speeds of the communication wire B1 and the communication wire B2 is in the range of the load which the central ECU 2 is capable of processing. The sum of the communication speeds of the communication wire B7 and the communication wire B10 falls below the communication speed of the communication wire B1, and the predetermined condition is satisfied.

After the writing process for the third ECU 50C is finished, the central ECU 2 starts the writing process for the fifth ECU 50E. After the writing process for the fifth ECU 50E is finished, the central ECU 2 starts the writing process for the fourth ECU 50D. This is for preventing the writing processes for the fourth ECU 50D and the fifth ECU 50E, which are connected with the communication wire B9, from being simultaneously performed. After the writing process for the seventh ECU 50G is finished, the central ECU 2 starts the writing process for the eighth ECU 50H. In this order, the writing processes for the seventh ECU 50G and the eighth ECU 50H, which are connected with the communication wire B10, are not performed in parallel.

After the writing processes for the third ECU 50C and the seventh ECU 50G are finished, the eleventh ECU 50K returns from sleep in response to the wake-up request, and the writing process for the eleventh ECU 50K is started. The eleventh ECU 50K is connected with the communication wire B4 with the highest communication speed. Thus, the writing process for the eighth ECU 50H, which is connected with the communication wire B10a with the lowest communication speed, and the writing process for the eleventh ECU 50K are in parallel performed.

As described above, the vehicle control system 1 can execute, in parallel, writing of programs to plural ECUs such that limits of the communication speeds of the communication wires in the vehicle control system 1 are not exceeded. When the limits of the communication speeds are exceeded, a specific communication wire becomes a bottleneck, a delay in a process is thereby caused, and further a possibility occurs that writing of the program fails due to time-out of communication. When writing of the program fails, time is consumed for a retry of the writing process. In a state where the limits of the communication wires are exceeded, the communication load to the central ECU 2 possibly becomes excessively large. Writing of programs is performed while those situations are avoided, and writing of programs to plural ECUs in the vehicle control system 1 can thereby be completed in a short time period.

The third ECU 50C is the FI control unit, for example. Thus, as for actions in a case where the present disclosure is applied to the vehicle V which does not include an internal combustion engine as the drive source for causing the vehicle V to travel but in which a motor is installed, except the actions related to the third ECU 50C, similar actions to FIG. 7 are executed.

FIG. 8 illustrates an example of the vehicle V which includes an internal combustion engine as the drive source for causing the vehicle V to travel but does not include a motor. The fourth ECU 50D is the motor control unit, for example, and the fifth ECU 50E is the BATT control unit, for example. In the vehicle V which does not include a motor, the fourth ECU 50D and the fifth ECU 50E are not installed.

A section (a) in FIG. 8 indicates the writing process for the zone-A ECU 11, a section (b) in FIG. 8 indicates the writing process for the third ECU 50C, and a section (c) in FIG. 8 indicates the writing process for the sixth ECU 50F. A section (f) in FIG. 8 indicates the writing process for the seventh ECU 50G, and a section (g) in FIG. 8 indicates the writing process for the eighth ECU 50H. A section (h) in FIG. 8 indicates the writing process for the zone-B ECU 13, a section (i) in FIG. 8 indicates the writing process for the eleventh ECU 50K, and a section (j) in FIG. 8 indicates the writing process for the ninth ECU 50I or the tenth ECU 50J.

Because the vehicle V illustrated in FIG. 8 does not include the fourth ECU 50D or the fifth ECU 50E, even when the sixth ECU 50F is connected with the communication wire with a lower speed, the sixth ECU 50F acts without disturbance. Thus, the sixth ECU 50F may be connected with the zone-A ECU 11 by the communication wire at 500 kbps, for example. In this case, the writing process for the sixth ECU 50F consumes a longer time period. However, as illustrated in FIG. 8, the writing process for the sixth ECU 50F is quickly started after the writing process for the third ECU 50C is finished, and the writing processes for plural ECUs including the sixth ECU 50F can thereby be completed in a short time period.

The above embodiment represents one specific example to which the present invention is applied but does not limit forms to which the invention is applied.

In the above embodiment, a configuration is made such that the processes illustrated in FIG. 4 to FIG. 6 are executed in a state where no program is written to the memory 93, but the central ECU 2 may overwrite a program to the memory 93, to which a program has been written, in step SA19. In this case, because the program of each of the ECUs of the vehicle control system 1 is newest by the program writing step, work for in advance checking the version of the program can be omitted.

In the above embodiment, a description is made about an example where the memory 220 in a state where that in advance stores the writing data 230 is installed in the vehicle V, but this is one example. For example, after the central ECU 2 is installed in the vehicle V, in the ECU wire-connection step (step S36) or the battery installation step (step S37), or before or after those, the writing data 230 may be transmitted from the diagnostic device 300 to the central ECU 2, and the writing data 230 may thereby be stored in the central ECU 2. In this case, because it is sufficient that data or a program to be stored in the memory 220 by the central ECU 2 is prepared before the program writing step (step S40), a further improvement in efficiency in the manufacturing steps of the vehicle V can be intended.

The configuration of the vehicle control system 1 which is described in the above embodiment is one example, and types of the ECUs, the number of ECUs, and configurations of devices as control targets of the ECUs included in the vehicle control system 1 can variously be changed.

Step units illustrated in FIG. 2 and FIG. 4 to FIG. 6 result from division which corresponds to main process contents for easy understanding of the manufacturing steps of the vehicle V and the actions in the vehicle control system 1 and are not limited by manners of division of the process units or names. Division into more step units may be made in accordance with process contents. Division may be made such that one step unit includes more processes. The order of steps may appropriately be switched.

Contents described in the present embodiment can appropriately be combined. For example, each of a configuration 1 to a configuration 10 which will be described in the following can be combined with the other arbitrary configuration.

The above embodiment supports the following configurations.

(Configuration 1) A vehicle control system including: a vehicle control unit which includes a non-volatile program storage unit and controls a function unit installed in a vehicle by executing a program stored in the program storage unit; and a master control unit which is connected with the vehicle control unit, in which the master control unit includes a non-volatile master storage unit, stores writing data for writing the program to the program storage unit in the master storage unit, is capable of executing a writing process of writing the program to the program storage unit provided to the vehicle control unit based on the writing data, selects a processing target control unit, which is set as a target of the writing process, from plural vehicle control units based on a predetermined selection condition, transmits a wake-up request to the processing target control unit, and subsequently performs the writing process for the processing target control unit.

In the vehicle control system of the configuration 1, because the program is capable of being written to the vehicle control unit by the master control unit, in manufacturing steps of the vehicle, the master control unit can write the program to the vehicle control unit. Thus, it is possible to supply the vehicle control unit in a state where the program is not installed to the manufacturing steps of the vehicle and to write the program after the vehicle control unit is connected with the master control unit. In a case where the program is written to the vehicle control unit, the master control unit selects the processing target control unit from the vehicle control units based on the predetermined selection condition and can thus sequentially perform writing of programs for the plural vehicle control units in proper order. Accordingly, while a step of checking a specification or a state of the program of the vehicle control unit and a step of writing the program to each vehicle control unit are skipped or simplified, the program can certainly be managed. Consequently, it is possible to shorten a production time period in a manufacturing factory of the vehicle while an improvement in fuel efficiency of the vehicle and installation of driving assistance technologies and preventive safety technologies in the vehicle are handled, and reduction in an emission amount of carbon dioxide in the manufacturing steps of the vehicle can be realized.

(Configuration 2) The vehicle control system which is described in the configuration 1, in which the writing data include the program which is written to the program storage unit and association data which associate the program with the vehicle control unit, and the master control unit performs the writing process for the vehicle control unit in accordance with the association data.

In the vehicle control system of the configuration 2, the program which is written to the vehicle control unit by the master control unit is clearly specified, and the master control unit can accurately write programs to plural vehicle control units. Thus, a program which is compatible with the vehicle control unit can certainly be written to the vehicle control unit by the master control unit. Accordingly, reliability in the manufacturing steps of the vehicle can more certainly be maintained.

(Configuration 3) The vehicle control system which is described in the configuration 1 or the configuration 2, in which the vehicle control unit includes a primary control unit which is connected with the master control unit by a higher-level communication wire and a secondary control unit which is connected with the primary control unit by a lower-level communication wire and is connected with the master control unit via the primary control unit, and the master control unit selects the primary control unit as the processing target control unit in preference to the secondary control unit.

In the vehicle control system of the configuration 3, in a configuration in which the vehicle control unit is connected with the master control unit through plural levels, the master control unit can write the program to the vehicle control unit at each stage. Accordingly, in the vehicle control system which has plural vehicle control units, the program can be written to each of the vehicle control units in proper order. Accordingly, writing of programs in the manufacturing steps of the vehicle can smoothly be performed. Thus, it is possible to further shorten the production time period in the manufacturing factory of the vehicle.

(Configuration 4) The vehicle control system which is described in the configuration 3, in which the vehicle control unit includes plural primary control units, and the master control unit selects the primary control unit as the processing target control unit in order based on the number of secondary control units which are connected with each of the primary control units.

In the vehicle control system of the configuration 4, in a case where plural vehicle control units are present which are directly connected with the master control unit, the order for writing of programs to those vehicle control units can properly be decided.

Accordingly, writing of programs in the whole vehicle control system can smoothly be performed, and it is possible to further shorten the production time period in the manufacturing factory of the vehicle.

(Configuration 5) The vehicle control system which is described in the configuration 4, in which the master control unit selects, from the plural primary control units, the primary control unit, with which a larger number of secondary control units are connected, as the processing target control unit in preference to the other primary control units.

(Configuration 6) The vehicle control system which is described in any one of the configuration 3 to the configuration 5, in which the master control unit is capable of selecting the plural vehicle control units as the processing target control units, is capable of executing, in parallel, the writing processes for a first primary control unit which is connected with a first higher-level communication wire and for a second primary control unit which is connected with a second higher-level communication wire or the secondary control unit which is connected with the second primary control unit by the lower-level communication wire, and is capable of executing, in parallel, the writing processes for a first secondary control unit which is connected with a third primary control unit by a first lower-level communication wire and for a second secondary control unit which is connected with the third primary control unit by a second lower-level communication wire.

In the vehicle control system of the configuration 6, because the master control unit is capable of executing, in parallel, the writing processes of programs for plural vehicle control units, it is possible to further shorten the production time period in the manufacturing factory of the vehicle. Because a load in a case where the writing processes of programs are executed in parallel for plural vehicle control units is properly distributed, writing of programs in the whole vehicle control system can more smoothly be performed.

(Configuration 7) The vehicle control system which is described in the configuration 6, in which in a case where a communication speed of a third higher-level communication wire which connects the master control unit with the third primary control unit is larger than a sum of a communication speed of the first lower-level communication wire and a communication speed of the second lower-level communication wire, the master control unit is capable of executing, in parallel, the writing processes for the first secondary control unit and for the second secondary control unit.

In the vehicle control system of the configuration 7, because a communication load in a case where the writing processes of programs are executed in parallel for plural vehicle control units does not become excessively large, writing of programs in the whole vehicle control system can more smoothly be performed.

(Configuration 8) The vehicle control system which is described in the configuration 6 or the configuration 7, in which in a case where the writing processes are executed for plural secondary control units, the master control unit executes, in parallel, the writing processes for the secondary control unit which is connected by the lower-level communication wire with a highest communication speed and for the secondary control unit which is connected by the lower-level communication wire with a lowest communication speed.

In the vehicle control system of the configuration 8, because the communication load in a case where the writing processes of programs are executed in parallel for plural vehicle control units can properly be adjusted, writing of programs in the whole vehicle control system can more smoothly be performed.

(Configuration 9) The vehicle control system which is described in any one of the configuration 3 to the configuration 5, in which the master control unit is capable of selecting the plural vehicle control units as the processing target control units, does not select the secondary control unit that is connected with the primary control unit, which is selected, by the lower-level communication wire in a case where the primary control unit is selected as the processing target control unit, and does not simultaneously select the plural secondary control units, which are connected with one lower-level communication wire, as the processing target control units.

In the vehicle control system of the configuration 9, because the master control unit is capable of executing, in parallel, the writing processes of programs for plural vehicle control units, it is possible to further shorten the production time period in the manufacturing factory of the vehicle. Because the load in a case where the writing processes of programs are executed in parallel for plural vehicle control units is properly distributed, writing of programs in the whole vehicle control system can more smoothly be performed.

(Configuration 10) A program writing method in a vehicle control system including a vehicle control unit which controls a function unit installed in a vehicle by executing a program and a master control unit which is connected with the vehicle control unit, the program writing method including: storing writing data for writing the program to the vehicle control unit in a non-volatile master storage unit provided to the master control unit; by the master control unit, selecting a processing target control unit, which is set as a target of a writing process, from plural vehicle control units based on a predetermined selection condition;
transmitting a wake-up request to the processing target control unit; and executing the writing process of writing the program to a non-volatile program storage unit provided to the processing target control unit which responds to the wake-up request.

In the program writing method of the configuration 10, because the program is capable of being written to the vehicle control unit by the master control unit, in the manufacturing steps of the vehicle, the master control unit can write the program to the vehicle control unit. Thus, it is possible to supply the vehicle control unit in a state where the program is not installed to the manufacturing steps of the vehicle and to write the program after the vehicle control unit is connected with the master control unit. In a case where the program is written to the vehicle control unit, the master control unit selects the processing target control unit from the vehicle control units based on the predetermined selection condition and can thus sequentially perform writing of programs for the plural vehicle control units in proper order. Accordingly, while a step of checking a specification or a state of the program of the vehicle control unit and a step of writing the program to each vehicle control unit are skipped or simplified, the program can certainly be managed. Consequently, it is possible to shorten the production time period in the manufacturing factory of the vehicle while an improvement in fuel efficiency of the vehicle and installation of driving assistance technologies and preventive safety technologies in the vehicle are handled, and reduction in the emission amount of carbon dioxide in the manufacturing steps of the vehicle can be realized.

REFERENCE SIGNS LIST 1 vehicle control system
2 central ECU (master control unit)
11 zone-A ECU (vehicle control unit, primary control unit)
13 zone-B ECU (vehicle control unit, primary control unit)
19 DLC (connection unit)
21 processing unit
23 communication device
50 ECU
50C third ECU (vehicle control unit, secondary control unit)
50D fourth ECU (vehicle control unit, secondary control unit)
50E fifth ECU (vehicle control unit, secondary control unit)
50F sixth ECU (vehicle control unit, secondary control unit)
50G seventh ECU (vehicle control unit, secondary control unit)

50H eighth ECU (vehicle control unit, secondary control unit)
50I ninth ECU (vehicle control unit)
50J tenth ECU (vehicle control unit)
50K eleventh ECU (vehicle control unit)
91, 91A, 91B, 91C, 91D, 91E, 91F, 91G, 91H processor
93, 93A, 93B, 93C, 93D, 93E, 93F, 93G, 93H memory (program storage unit)
210 processor
220 memory (master storage unit)
221 control program
222 control data
230 writing data
231 writing processing program
232 writing setting table (association data)
233, 233A, 233B ECU program
235 result data
300 diagnostic device (external device)
B1, B2 communication wire (higher-level communication wire)
B3 to B6 communication wire
B7 to B14 communication wire (lower-level communication wire)
CB communication cable
V vehicle

What is claimed is:

1. A vehicle control system comprising:
plural vehicle control units, each of the plural vehicle control units including a vehicle control processor and a non-volatile program storage unit and controlling a function unit installed in a vehicle by executing a program stored in the program storage unit; and
a master control unit which includes a master processor and is connected with the plural vehicle control units, wherein
the master control unit
includes a non-volatile master storage unit, stores writing data for writing the program to the program storage unit in the master storage unit,
is configured to execute a writing process of writing the program to the program storage unit provided to the vehicle control unit based on the writing data,
selects a processing target control unit, which is set as a target of the writing process, from the plural vehicle control units based on a predetermined selection condition, and
transmits a wake-up request to the processing target control unit, and subsequently performs the writing process for the processing target control unit,
the plural vehicle control units each include
a primary control unit which is connected with the master control unit by a higher-level communication wire, and
a secondary control unit which is connected with the primary control unit by a lower-level communication wire and is connected with the master control unit via the primary control unit, and
the master control unit selects the primary control unit as the processing target control unit in preference to the secondary control unit.

2. The vehicle control system according to claim 1, wherein
the writing data include the program which is written to the program storage unit and association data which associate the program with the vehicle control unit, and
the master control unit performs the writing process for the vehicle control unit in accordance with the association data.

3. The vehicle control system according to claim 1, wherein
the plural vehicle control units include plural primary control units, and
the master control unit selects the primary control unit as the processing target control unit in order based on the number of secondary control units which are connected with each of the primary control units.

4. The vehicle control system according to claim 3, wherein
the master control unit selects, from the plural primary control units, the primary control unit, with which a larger number of secondary control units are connected, as the processing target control unit in preference to the other primary control units.

5. The vehicle control system according to claim 1, wherein
the master control unit
is configured to select the plural vehicle control units as the processing target control units,
is configured to execute, in parallel, the writing processes for a first primary control unit which is connected with a first higher-level communication wire and for a second primary control unit which is connected with a second higher-level communication wire or the secondary control unit which is connected with the second primary control unit by the lower-level communication wire, and
is configured to execute, in parallel, the writing processes for a first secondary control unit which is connected with a third primary control unit by a first lower-level communication wire and for a second secondary control unit which is connected with the third primary control unit by a second lower-level communication wire.

6. The vehicle control system according to claim 5, wherein
in a case where a communication speed of a third higher-level communication wire which connects the master control unit with the third primary control unit is larger than a sum of a communication speed of the first lower-level communication wire and a communication speed of the second lower-level communication wire, the master control unit is configured to execute, in parallel, the writing processes for the first secondary control unit and for the second secondary control unit.

7. The vehicle control system according to claim 5, wherein
in a case where the writing processes are executed for plural secondary control units, the master control unit executes, in parallel, the writing processes for the secondary control unit which is connected by the lower-level communication wire with a highest communication speed and for the secondary control unit which is connected by the lower-level communication wire with a lowest communication speed.

8. The vehicle control system according to claim 1, wherein
the master control unit
is configured to select the plural vehicle control units as the processing target control units,
does not select the secondary control unit that is connected with the primary control unit, which is selected, by the lower-level communication wire in a case where the primary control unit is selected as the processing target control unit, and does not simultaneously select the plural secondary control units, which are connected with one lower-level communication wire, as the processing target control units.

9. A program writing method in a vehicle control system including plural vehicle control units, each of the plural vehicle control units controlling a function unit installed in a vehicle by executing a program and a master control unit which is connected with the plural vehicle control units, the program writing method comprising:

storing writing data for writing the program to the vehicle control unit in a non-volatile master storage unit provided to the master control unit;

by the master control unit, selecting a processing target control unit, which is set as a target of a writing process, from the plural vehicle control units based on a predetermined selection condition;

transmitting a wake-up request to the processing target control unit; and executing the writing process of writing the program to a non-volatile program storage unit provided to the processing target control unit which responds to the wake-up request, the plural vehicle control units including a primary control unit which is connected with the master control unit by a higher-level communication wire, and a secondary control unit which is connected with the primary control unit by a lower-level communication wire and is connected with the master control unit via the primary control unit, and the program writing method further comprises, by the master control unit, selecting the primary control unit as the processing target control unit in preference to the secondary control unit.

* * * * *